(12) United States Patent
Rouleau

(10) Patent No.: US 6,927,704 B1
(45) Date of Patent: Aug. 9, 2005

(54) FAULT TOLERANT OPTOELECTRONIC POSITION SENSOR

(75) Inventor: James E. Rouleau, Burt, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/794,954

(22) Filed: Mar. 5, 2004

(51) Int. Cl.$^7$ .............................................. H03M 1/22
(52) U.S. Cl. ............................. 341/13; 341/1; 341/11; 250/231.13; 250/231.18
(58) Field of Search ........................... 341/1, 9, 11, 13; 250/231.13, 231.17, 231.18

(56) References Cited

U.S. PATENT DOCUMENTS

| | | | |
|---|---|---|---|
| 4,621,256 A | | 11/1986 | Rusk |
| 4,680,466 A | * | 7/1987 | Kuwahara et al. ...... 250/231.14 |
| 4,691,101 A | * | 9/1987 | Leonard ................ 250/231.16 |
| 4,720,699 A | | 1/1988 | Smith |
| 5,091,643 A | | 2/1992 | Okutani et al. |
| 5,173,602 A | | 12/1992 | Lin |
| 5,825,307 A | | 10/1998 | Titus et al. |
| 5,841,132 A | * | 11/1998 | Horton et al. ........... 250/231.1 |
| 6,015,971 A | * | 1/2000 | Liu ....................... 250/231.13 |
| 6,100,822 A | * | 8/2000 | Liu ................................. 341/9 |
| 6,501,069 B2 | | 12/2002 | Blasing |
| 6,552,330 B2 | | 4/2003 | Blasing |

FOREIGN PATENT DOCUMENTS

| | | |
|---|---|---|
| DE | 4022837 | 1/1992 |
| EP | 0 654 652 A1 | 5/1995 |

OTHER PUBLICATIONS

TSL218 512×1 Pixel Linear Array, by Texas Instruments, dated Aug, 1994, pp. 1-7.
MLX90255BA Linear Optical Array, by Microelectronic Integrated Systems, dated Aug. 2002, pp. 1-11.

* cited by examiner

Primary Examiner—Michael Tokar
Assistant Examiner—Khai Nguyen
(74) Attorney, Agent, or Firm—Michael D. Smith

(57) ABSTRACT

An assembly for optoelectronically sensing position includes a light source, a coded element, and a plurality of photosensors. Holes are disposed in the coded element to define a plurality of digital codes. The light passes through the holes in the coded element to illuminate the photosensors. The holes are sized and the photosensors are positioned such that the light is transmitted to more than one of the photosensors through each of the holes.

18 Claims, 4 Drawing Sheets

FAULT TOLERANT OPTOELECTRONIC POSITION SENSOR

FIELD OF THE INVENTION

The subject invention relates to an assembly for optoelectronically sensing position.

BACKGROUND OF THE INVENTION

Assemblies for optoelectronically sensing position are well known in the prior art. These assemblies are often referred to as encoders or angle of rotation sensors. The assemblies typically include a light source, a coded element, and a plurality of photosensors. An example of such an assembly is disclosed in U.S. Pat. No. 4,621,256 (the '256 patent).

The '256 patent discloses an assembly for sensing position utilizing a light source, a coded element, and a plurality of photosensors. The coded element has a plurality of holes defining digital codes representing position. The plurality of holes is assembled in the form of multiple tracks along the coded element. One photosensor per track is utilized to receive the light passed through the holes and convert the light into electrical signals. The electrical signals are then analyzed to determine a current value of the digital codes.

Two problems are common in assemblies for optoelectronically sensing position. The first problem concerns the alignment of the coded element to the photosensors. If each track of the coded element is not properly aligned with its corresponding photosensor, then the photosensor will not detect the light passing through the holes. This results in an incorrect determination of the current value of the digital codes. The second problem concerns the build-up of contaminants in the holes of the coded element. These contaminants often result from the wear of bearing surfaces used to allow movement of the coded element. When contaminants build up on the holes of the coded element, the amount of light passing through the holes is reduced, thus resulting in the incorrect determination of the current value of the digital codes.

There remains an opportunity for an assembly that is able to operate correctly despite poor alignment of the coded element to the photosensors and build-up of contaminants on the holes of the coded element.

SUMMARY OF THE INVENTION AND ADVANTAGES

The subject invention provides an assembly for sensing position comprising a light source for supplying light and a coded element. The coded element contains a plurality of holes which define digital codes that representing position. The assembly also comprises a plurality of photosensors for receiving the light passed through the plurality of holes to represent one of the digital codes. The photosensors provide electrical signals in response to the light. The holes are sized and the photosensors are positioned such that the light is transmitted to more than one of the photosensors through each of the holes.

The invention also provides a method of determining position. The method comprises the steps of transmitting light through holes in a coded element defining a plurality of digital codes representing position and sizing the holes and positioning a plurality of photosensors relative to the holes to receive light with more than one photosensor through each of the holes. The method further comprises the step of receiving light through the holes corresponding to one of the plurality of digital codes by the plurality of photosensors.

By requiring that more than one photosensor be illuminated by each hole of the coded element, the subject invention will operate correctly despite the build-up of contaminants in the holes and alignment problems between the coded element and the plurality of photosensors.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1A:
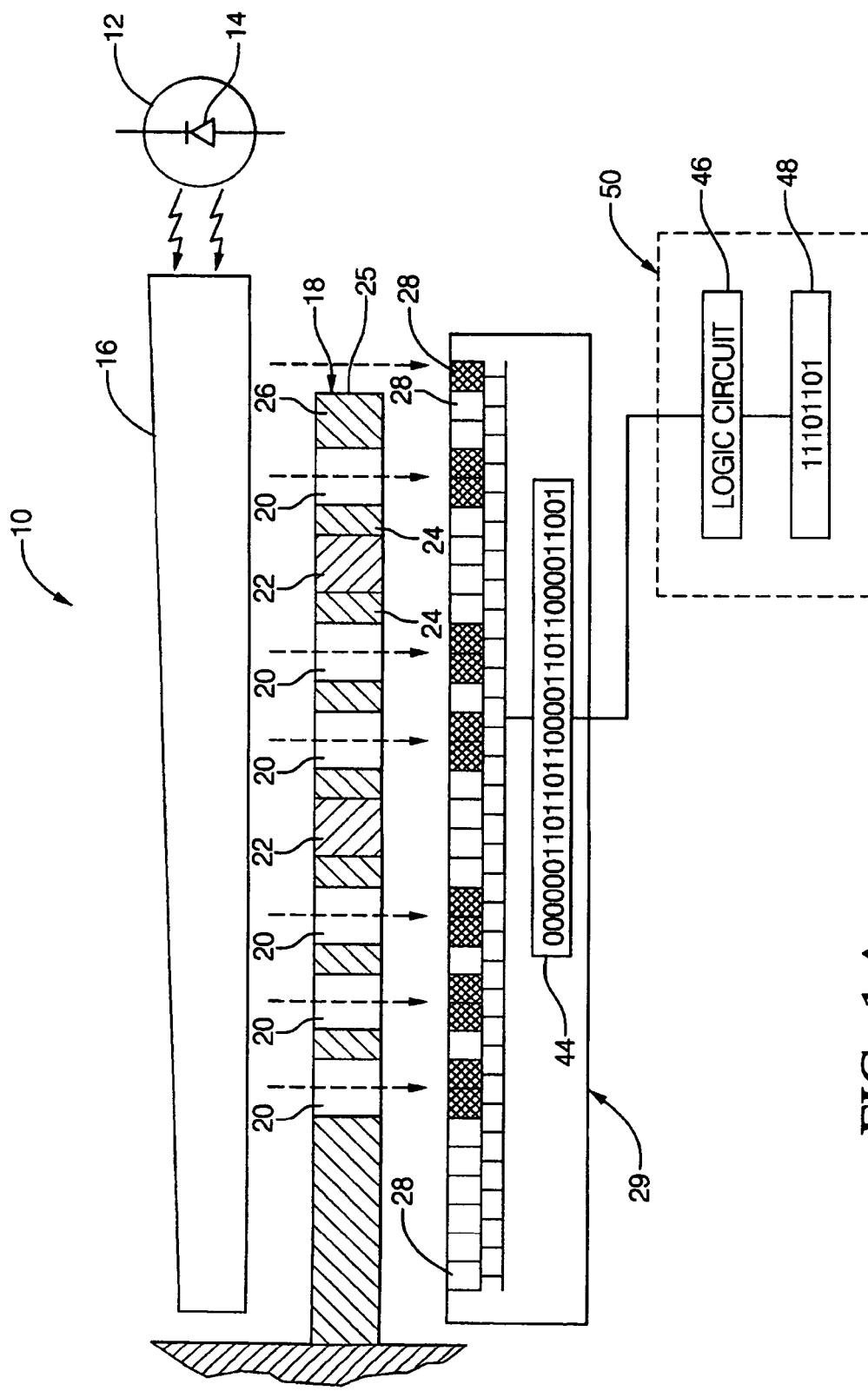
FIG. 1A is a schematic view of a preferred embodiment of the subject invention showing a cross-sectional representation of a coded element in a normal position.

Referring to the Figures, wherein like numerals indicate like parts throughout the several views, an assembly for sensing position is shown generally at 10 in FIG. 1A.

The assembly 10 includes a light source 12 that supplies light. In the preferred embodiment, the light source 12 is a light-emitting diode (LED) 14. Those skilled in the art will realize that other sources of light, including incandescent, fluorescent, or LASER sources could also be used. Preferably, a light guide 16 is used to evenly distribute the light provided by the LED 14.

The assembly 10 also includes a coded element 18 containing a plurality of holes 20. The coded element 18 is operatively connected to a movable object (not shown) whose position is to be measured. Examples of the movable object include, but are not limited to, a steering wheel of a vehicle, an arm of a robot, or a hand-operated control dial. The coded element 18 also contains a plurality of solid portions 22. The holes 20 and solid portions 22 define digital codes that represent position of the movable object. It is preferred that the coded element 18 also includes spacer portions 24 and an end portion 26, which are both solid. The holes 20 and solid portions 22 are arranged longitudinally along a plurality of tracks. The tracks are separated from each other by the spacer portions 24 and are generally parallel to each other. Each track represents one binary digit (i.e. bit) of the digital codes. The light is transmitted through the holes 20 in the coded element 18, as shown by dotted lines in FIG. 1A. The light is blocked by the solid portions 22, spacer portions 24, and end portion 26.

The assembly 10 further includes a plurality of photosensors 28. The photosensors 28 receive the light either passed through the holes 20 or otherwise not blocked by the coded element 18. The photosensors 28 provide electrical signals in response to the light. The plurality of photosensors 28 are disposed along a line transverse to the tracks. In the embodiments and examples illustrated herein, each photosensor 28 provides a high voltage signal (logical "1") when the photosensor 28 is illuminated and a low voltage signal (logical "0") when the photosensor 28 is not illuminated. However, those skilled in the art recognize that the photosensors 28 could work in the opposite manner, wherein an illuminated photosensor 28 provides a logical "0" and vice-versa.

Figure 1B:
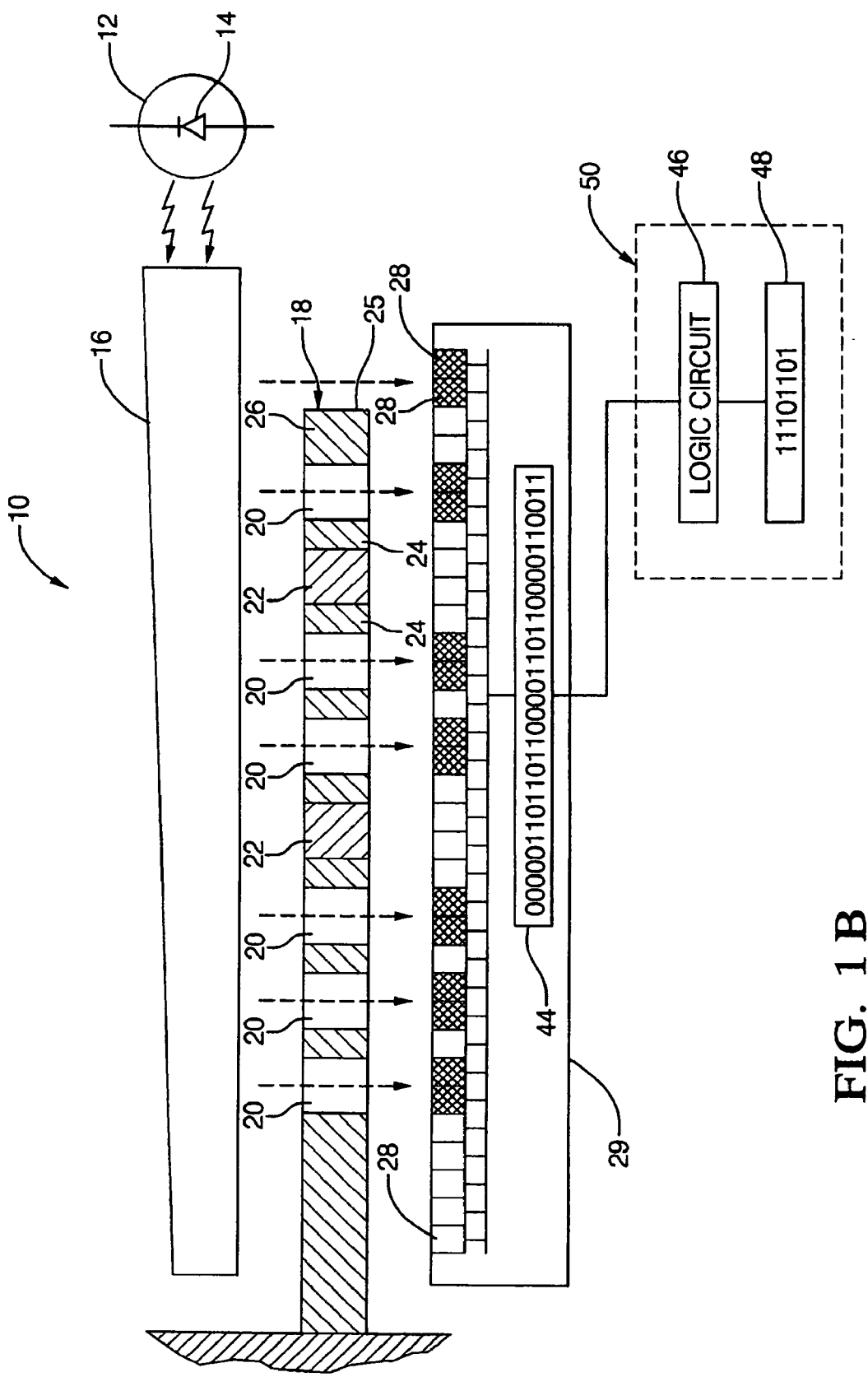
FIG. 1B is a schematic view of the preferred embodiment illustrating the coded element moved from the normal position.

The plurality of photosensors 28 may be packaged in a linear optical array 29. An example of a suitable array 29 is the MLX90255 manufactured by Melexis Microelectronic Systems of Ieper, Belgium, which includes 128 usable photosensors 28. Another example of a suitable array 29 is the TSL218 manufactured by Texas Instruments Inc. of Dallas, Tex., which employs 512 usable photosensors 28. Of course, many other suitable arrays 29 can be substituted for those mentioned above. For purposes of simplicity in illustration, the linear optical array 29 shown in FIGS. 1A and 1B utilize only thirty-two photosensors 28.

The holes 20 of the coded element 18 are sized and the photosensors 28 are positioned such that the light transmitted through each of the holes 20 illuminates more than one photosensor 28. Thus, if contaminants build up on the holes 20 of the coded element 18 to block the transmission of light, at least one photosensor 28 will still be illuminated.

A first binary register 44 is operatively connected to the plurality of photosensors 28 for storing bits generated by the electrical signals produced by the illumination of the photosensors 28. The first binary register 44 may be packaged within the linear optical array 29.

A logic circuit 46 is operatively connected to the first binary register 44. The logic circuit 46 analyzes the first binary register 44 and determines a value of the digital code. A second binary register 48 is also operatively connected to the logic circuit 46 for storing the value of the digital code. Preferably, the logic circuit 46 and the second binary register 48 are packaged together in an integrated circuit 50. Those skilled in the art will recognize that the integrated circuit 50 may be a microprocessor, microcontroller, application specific integrated circuit (ASIC), etc.

Figure 2:
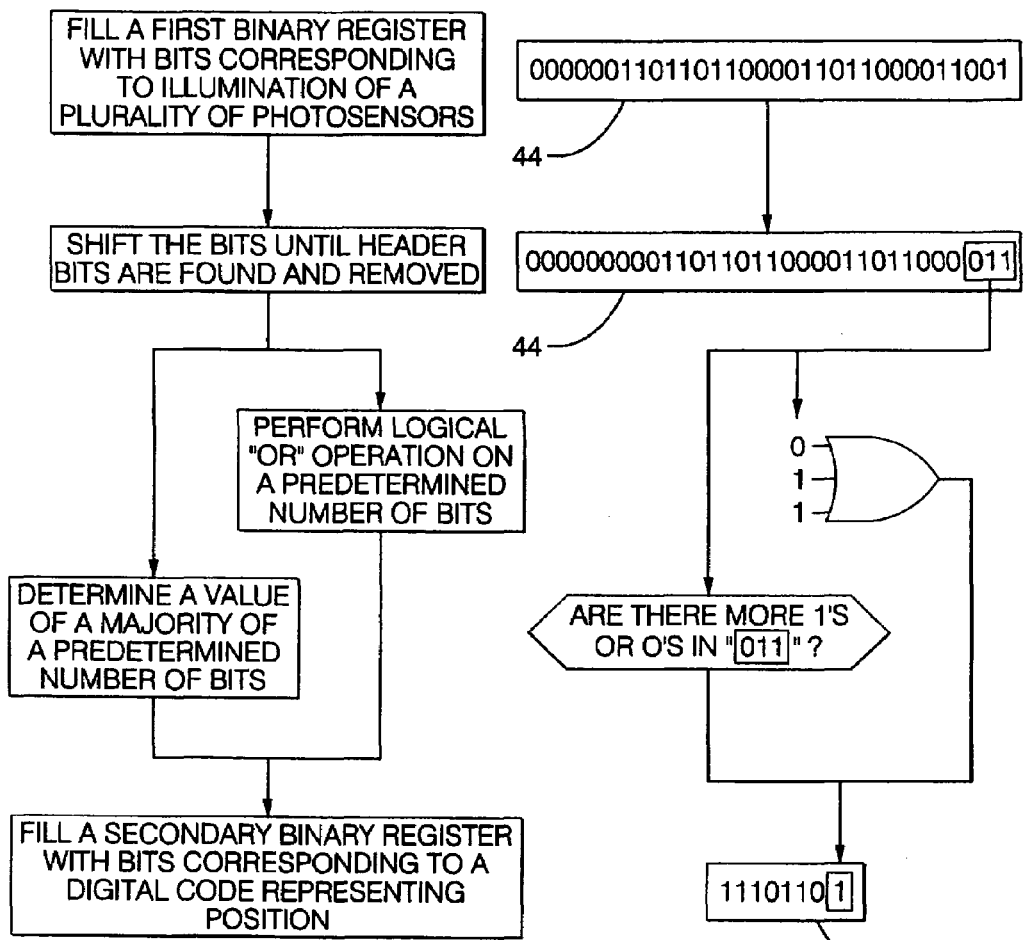
FIG. 2 is a flowchart showing a procedure to determine a value of a digital code.

Referring now to FIG. 2, a procedure is implemented to determine the value of the digital code. The procedure begins by shifting the bits of the first binary register 46. The bits are shifted until a start bit, illustrated by a first logical "0", is found. This first logical "0" represents an edge 25 of the coded element 18 and the beginning of the end portion 26. Due to mechanical issues, the coded element 18 may move from an original position as shown in FIG. 1A, to a runnout position in FIG. 1B. This change in position will not affect the procedure's ability to determine the value of the digital code, due to this first step of shifting bits until the first logical "0" representing the edge 25 of the coded element 18 is found. Once the first logical "0" is found, the bits of the first binary register 46 are then shifted again to remove a known number of bits that correspond to a width of the end portion 26.

The procedure continues by examining a predetermined number of bits of the first binary register 44 to determine a bit of the second binary register 48. This step can be performed by various techniques. In a first technique, a logical "OR" operation is performed on the predetermined number of bits. The result of the logical "OR" operation provides the bit of the second binary register 48. With a logical "OR" operation, if any of the predetermined number of bits is a logical "1", then the bit of the second binary register 48 will also be a logical "1". Only when all of the predetermined bits are logical "0"s, does the bit of the second binary register 48 become a logical "0".

A second technique involves determining a value of a majority of the predetermined number of bits. For example, if there are three predetermined number of bits, with two of them being logical "1"s and one being a logical "0", then the result is a logical "1". Obviously, this technique works best when the predetermined number is an odd number. However, a tie-breaker scheme could be implemented to allow the second technique to be implemented when the predetermined number of bits is even. Of course, additional techniques to examine the predetermined number of bits are contemplated by those skilled in the art.

In the preferred embodiment, the coded element 18 is a disk 30, as shown in FIG. 3A. The disk 30 has a center 32 and a circular edge 34. The plurality of photosensors 28 is positioned such that at least one photosensor 28 is outside the circular edge 34 of the disk 30. This allows the photosensors 28 to detect the edge 25 of the coded element 18. The plurality of photosensors 28 extends from the outside of the circular edge 34 toward the center 32 of the disk 30.

Referring now to FIG. 3B, in a first alternative embodiment, the coded element 18 is a cylinder 36. The cylinder 36 has a top edge 40 and a bottom edge 42. Again, the plurality of photosensors 28 is positioned such that at least one photosensor 28 is outside the top edge 40 of the cylinder 36. The plurality of photosensors 28 extend from outside the top edge 40 toward the bottom edge 42.

Figure 3C:
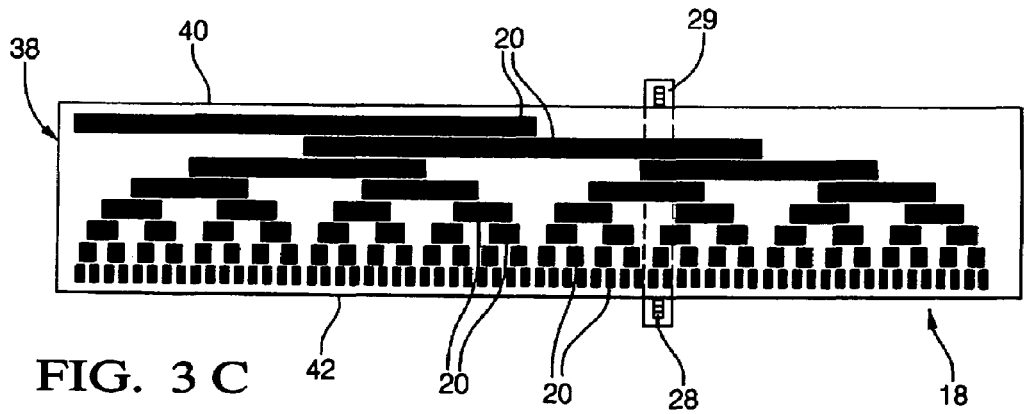
FIG. 3C is a top view of a strip as the coded element utilizing a Gray code.
Figure 3:
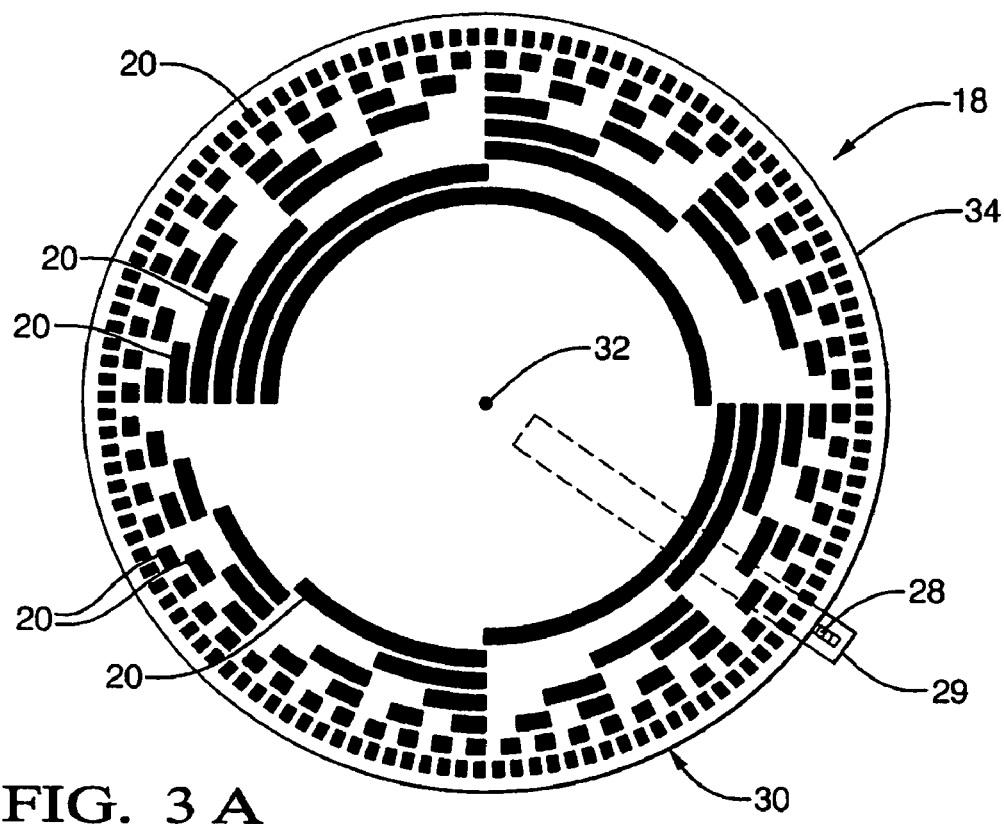
FIG. 3A is a top view of a disk as the coded element.
FIG. 3B is a perspective view of a cylinder as the coded element.
Figure 3:
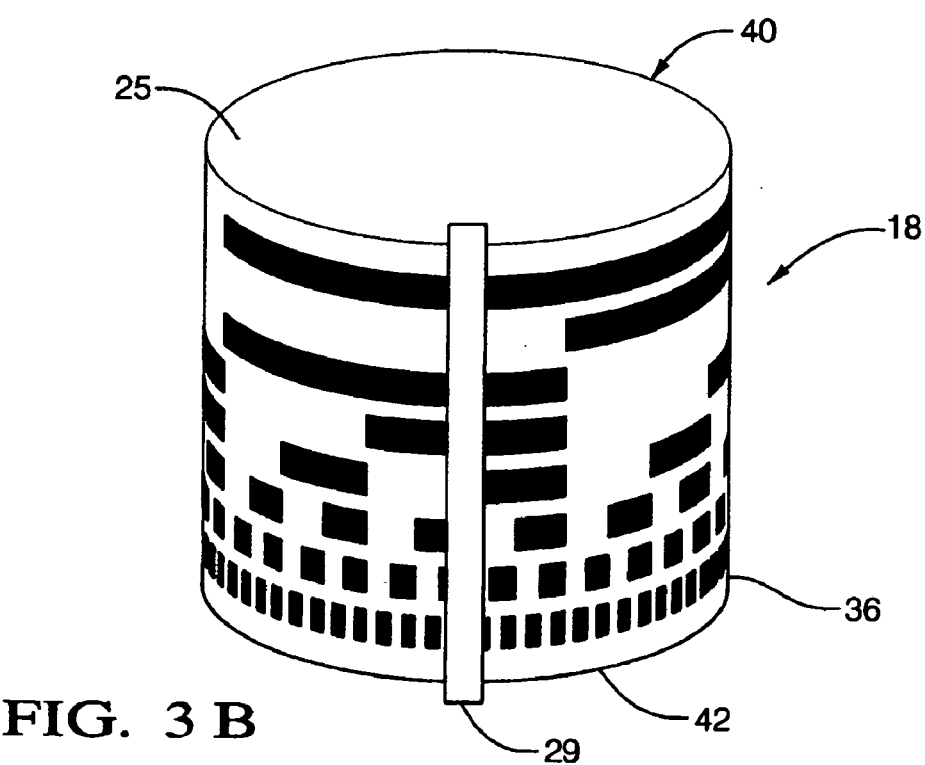

In a second alternative embodiment, as shown in FIG. 3C, a strip 38 is the coded element 18. Like the cylinder 36, the strip 38 also includes a top edge 40 and a bottom edge 42, and the plurality of photosensors 28 is positioned in a similar fashion.

The digital codes defined on the coded element 18 may be implemented with error-reducing properties. For example, a Gray code may be used, as shown in FIG. 3C. Gray codes are well known in the art and are described in U.S. Pat. No. 2,632,058 to Frank Gray.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An assembly for sensing position comprising:
   a light source for supplying light;
   a coded element containing a plurality of holes disposed longitudinally along a plurality of tracks and defining digital codes representing position;
   a plurality of photosensors disposed along a line transverse to said tracks for receiving said light passed through said plurality of holes representing one of said digital codes and providing electrical signals in response to said light;
   said holes being sized and said photosensors positioned relative to said holes such that said light illuminates more than one of said photosensors through each of said holes adjacent to said line.

2. An assembly as set forth in claim 1 further comprising a first binary register operatively connected to said plurality of photosensors for storing bits generated by said electrical signals.

3. An assembly as set forth in claim 2 further comprising a logic circuit operatively connected to said first binary register for determining a value of said digital code by shifting said bits until a start bit corresponding to an edge of said coded element is found and examining a predetermined number of said bits corresponding to a width of said tracks.

4. An assembly as set forth in claim 3 further comprising a second binary register operatively connected to said logic circuit for storing said value of said digital code.

5. An assembly as set forth in claim 1 further comprising a light guide for evenly distributing said light.

6. An assembly as set forth in claim 1 wherein said coded element is further defined as a disk having a center and a circular edge with said tracks disposed as concentric circles and said plurality of photosensors positioned radially between said circular edge and said center.

7. An assembly as set forth in claim 1 wherein said coded element is further defined as a cylinder having a top edge and a bottom edge with said tracks disposed as circles around a center axis and said plurality of photosensors positioned between said top edge and said bottom edge.

8. An assembly as set forth in claim 1 wherein said coded element is further defined as a strip having a top edge and a bottom edge with said tracks disposed linearly and said plurality of photosensors positioned between said top edge and said bottom edge.

9. An assembly as set forth in claim 1 wherein said light source is further defined as a light emitting diode.

10. An assembly as set forth in claim 1 wherein said digital codes have error-correcting properties.

11. An assembly as set forth in claim 10 wherein said digital codes are Gray codes.

12. A method of determining position comprising the steps of:
moving a coded element having a plurality of holes disposed longitudinally along a plurality of tracks and defining digital codes representing position;
supplying light through the holes of the coded element; and
sensing light supplied though the holes with a line of photosensors disposed transverse to the tracks and positioned such that each hole illuminates more than one photosensor.

13. A method as set forth in claim 12 further comprising the steps of filling a first binary register with bits corresponding to the illumination of the photosensors, shifting the bits until a start bit corresponding to an edge of the coded element is found, and examining a predetermined number of bits of the first binary register corresponding to a width of the holes to determine a bit of a second binary register.

14. A method of determining position comprising the steps of:
transmitting light through holes in a coded element defining a plurality of digital codes representing position;
sizing the holes and positioning a plurality of photosensors relative to the holes to receive light with more than one photosensor through each of the holes;
receiving light through the holes corresponding to one of the plurality of digital codes by the plurality of photosensors;
filling a first binary register with bits corresponding to the illumination of the photosensors; and
analyzing the bits of the first binary register to determine a value of the digital code.

15. A method as set forth in claim 14 wherein the step of analyzing the bits of the first binary register comprises the step of shifting the bits until a start bit corresponding to an edge of the coded element is found.

16. A method as set forth in claim 15 wherein the step of analyzing the bits of the first binary register further comprises the step of examining a predetermined number of bits of the first binary register corresponding to a width of the holes to determine a bit of a second binary register.

17. A method as set forth in claim 16 wherein the step of examining a predetermined number of bits of the first binary register is further defined as performing a logical "OR" operation on the predetermined number of bits.

18. A method as set forth in claim 16 wherein the step of examining a predetermined number of bits of the first binary register is further defined as determining a value of a majority of the predetermined number of bits.

* * * * *